United States Patent Office 3,737,533
Patented June 5, 1973

3,737,533
COMPOSITIONS AND METHODS OF COMBATTING INSECTS USING 1' - VARIABLE - 1',1'-DIHALO-HALOBENZENEAZOMETHANES
Malcolm W. Moon and Victor L. Rizzo, Kalamazoo, Mich., assignors to The Upjohn Company, Kalamazoo, Mich.
No Drawing. Filed Apr. 28, 1971, Ser. No. 138,300
Int. Cl. A01n 9/20
U.S. Cl. 424—226                                27 Claims

ABSTRACT OF THE DISCLOSURE

Some new 1'-variable-1,1'-dihalo-halobenzeneazomethanes have been synthesized and found to be active against arthropod pests, particularly insects and mites. The 1',1'-halogens may be bromine, chlorine, or fluorine, independently. The benzene ring has two and, variably, up to five substituents; for example, halogen atoms (at least one), alkyl groups, alkoxyl groups, and halo-alkyl groups. The 1'-variable group may have as many as 12 carbon atoms. Methods for use in controlling arthropod pests are described. Representative formulations for use as antiarthropodal agents are also described.

SUMMARY OF INVENTION

This invention pertains to new organic chemical compounds, a process for preparing the same, a new method for controlling arthropod pests, and new formulations comprising the new compounds for use in controlling arthropod pests. The invention is more particularly directed to new 1'-variable-1',1'-dihalo-halobenzeneazomethanes, a new process for preparing the same, a new method for controlling arthropod pests therewith, particularly insects and mites, and new pesticidal formulations comprising 1'-variable-1',1'-dihalo-halobenzeneazomethanes as the characterizing active agent.

The new 1' - variable-1',1' - dihalo-halobenzeneazomethanes of this invention have the general structural formula:

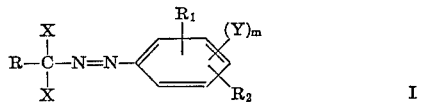

I wherein R is hydrogen; alkyl of from 1 to 7 carbon atoms, inclusive; cycloalkyl of from 3 to 7 carbon atoms, inclusive; haloalkyl of from 1 to 7 carbon atoms, inclusive; halocycloalkyl of from 3 to 7 carbon atoms, inclusive; alkoxalkyl of from 2 to 8 carbon atoms, inclusive; hydroxyalkyl of from 1 to 7 carbon atoms, inclusive; and phenyl, optionally having 1, 2, or 3 substituents, e.g., halogen atoms, lower-alkyl of from 1 to 4 carbon atoms, inclusive, haloloweralkyl of from 1 to 4 carbon atoms, inclusive, and lower-alkoxy of from 1 to 4 carbon atoms, inclusive; the X's are independently chlorine, bromine, or fluorine; $m$ is an integer 0, 1, 2, or 3; and $R_1$, $R_2$ and Y independently selected from halogen; lower-alkyl of from 1 to 4 carbon atoms, inclusive; halolower-alkyl of from 1 to 4 carbon atoms, inclusive; or lower-alkoxy of from 1 to 4 carbon atoms, inclusive, providing however, that at least one of $R_1$ and $R_2$ is halogen, and that the sum of the carbon atoms in substituents $R_1$, $R_2$, and Y may not be more than 15.

DETAILED DESCRIPTION OF THE INVENTION

The new 1' - variable - 1',1'-dihalo-halobenzeneazomethanes of this invention (compounds according to Formula I) are prepared by vigorous halogenation procedures. More particularly, the compounds are prepared, for example, by halogenating an appropriate alkanaldehyde phenylhydrazone, a cycloalkanaldehyde phenylhydrazone, a benzaldehyde phenylhydrazone, a 2-oxoalkanoic acid 2-phenylhydrazone, an alkanoyl halide phenylhydrazone, a polymethylenecarboxyl halide phenylhydrazone, or a benzoyl chloride phenylhydrazone. A representative preferred strong halogenation procedure is to react elemental chlorine or bromine with an alkanaldehyde phenylhydrazone or an alkanoyl halide phenylhydrazone.

Illustratively, a reaction can be effected between elemental chlorine and an alkanaldehyde phenylhydrazone in the presence of a liquid reaction medium. Optimally, the reaction tempreature is in the range of minus 10° C. to minus 50° C. up to about 50° C. Suitable liquid reaction media include chloroform, carbon tetrachloride, trichlorofluoromethane, methyl chloride, benzene, technical hexane, and acetic acid. The reaction medium is not critical so long as the reactants have practical limits of solubility therein and the medium is not reactive itself with the reactants. Cheapness, ease of removal by evaporation, and recoverability are considerations pertinent to selection of a reaction medium. The reaction temperature is not critical, but convenience in handling halogenating agents dictates preferences.

The new compounds are recovered from the reaction mixture by conventional techniques including filtration, solvent evaporation, distillation, chromatography, and crystallization. In the simplest situation, the desired 1'-variable-1',1'-dihalo-halobenzeneazomethane separates as a solid from the reaction mixture and is recovered on a filter. Purification is then accomplished by washing the filter cake with an appropriate liquid and recrystallizing the solids from a suitable solvent. Representative solvents for crystallization are petroleum ether, methanol, ethanol, and mixtures of benzene and technical hexane.

On the other hand, most of the compounds of this invention are colored liquids and these are readily purified by chromatographic techniques. For example, the reaction medium is removed by evaporation and the red oil thus obtained is dissolved in an organic liquid and passed through a chromatographic substrate, e.g., silica gel. Various organic liquids can be used for development of the chromatogram, a representative suitable one is a 1:9 mixture of benzene and technical hexane (parts are by volume). A 1:3 mixture is also suitable. The liquid compounds of this invention may also be purified by distillation at a reduced pressure. The reduced pressure is necessary as the compounds decompose with evolution of nitrogen at a temperature of about 250° C.

Further illustratively, halogenation of, e.g., an alkanaldehyde phenylhydrazone, a benzaldehyde phenylhydrazone, a cycloalkyl carbonyl halide (e.g., chloride) phenylhydrazone, or a 2-oxoalkanoic acid 2-phenylhydrazone can be effected with organic hypohalites. For example, trifluoromethyl hypofluorite can be reacted with an alkanoyl chloride phenylhydrazone. This reaction is advantageously effected at low temperatures, e.g., −20° C. to −60° C. although slightly higher and even lower temperatures can be used. The desired products are recovered and purified by the same conventional techniques mentioned above and known in the art.

The starting compounds for the process of this invention, e.g., alkanaldehyde phenylhydrazones, 2-oxoalkanoic acid 2-phenylhydrazones, alkanoyl halide phenylhydrazones, cycloalkyl carbonyl halide phenylhydrazones, benzoyl chloride phenylhydrazones, and others indicated by Formula I and the foregoing description are known compounds or they can be readily prepared by well-known methods. Illustratively, an alkanaldehyde can be reacted with a phenylhydrazine according to the method described by E. Fischer, Chem. Ber. 29, page 794 (1896) to obtain alkanaldehyde phenylhydrazones.

Alkanoyl halide phenylhydrazone starting compounds are readily prepared by reacting an alkanaldehyde phenylhydrazone prepared as above with a halogenating agent according to the method described by J. E. Humphries, H. Humble, and R. Evans, J. Chem. Soc. 127, p. 1304 (1925).

Alkanoyl halide phenylhydrazones are also prepared by reacting an alkanoic acid phenylhydrazide with phosphorus pentachloride.

The alkanoic acid phenylhydrazide starting compounds are known or can be readily prepared by known methods. According to one method an alkanoyl chloride is reacted with a phenylhydrazine, using the procedures described by J. Hausknecht, Chem. Ber. 22, p. 324 (1889), and E. Bamberger and W. Pemsel, Chem. Ber. 36, p. 359 (1903). Another method described in U.S. Pat. No. 2,912,461, issued Nov. 10, 1959, can be utilized to react an alkanoate ester and a phenylhydrazine. Still another method described by W. Autenrieth and G. Thomae, Chem. Ber. 57, p. 423 (1924), can be used to react an alkanoic acid anhydride with a phenylhydrazine and produce the corresponding alkanoic acid phenylhydrazide.

An alternative synthesis for the compounds of this invention according to Formula I wherein at least one of $R_1$ and $R_2$ are halogen is by reaction of an acyl or benzoyl halophenyldiimide with a phosphorus halide, for example phosphorus pentachloride in an inert solvent, for example carbon tetrachloride, at a temperature of between 25° C. and the reflux temperature of the solution. The acyl or benzoyl halophenyldiimide starting compounds are prepared by oxidation of an alkanoic acid halophenylhydrazide or benzoic acid halophenylhydrazide using the methods as described by R. Pütter in Methoden der Organishen Chemie (Houben Weil)-10, part 3, pp. 616–9 (1967). This method is particularly useful when compounds of the invention with a hydrogen substituent at a 2,4- or 6-position in the benzene ring are to be synthesized, for example, in the synthesis of 1',1',2,4-tetrachlorobenzeneazopropane

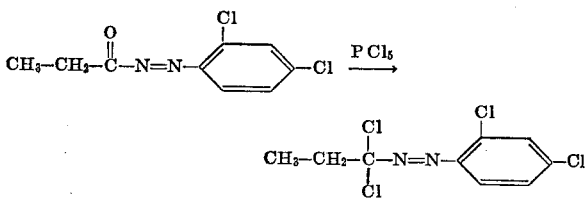

Referring to general Formula I and the variables R, X, $R_1$, $R_2$, Y, and $m$ specified therein some representative variations can be indicated.

In particular, R being alkyl of from 1 to 7 carbon atoms, inclusive, means methyl, ethyl, propyl, butyl, pentyl, hexyl, heptyl, and isomeric forms thereof. Similarly, cycloalkyl of from 3 to 7 carbon atoms, inclusive, means cyclopropyl, cyclobutyl, cyclopentyl, cyclohexyl, alkyl substituted forms thereof, and cycloheptyl.

Hydroxyalkyl of from 1 to 7 carbon atoms, inclusive, includes for example, hydroxymethyl, 2-hydroxyethyl, 3-hydroxypropyl, 4-hydroxybutyl, 5-hydroxypentyl, 6-hydroxyhexyl, 7-hydroxyheptyl, and the various branched chain and hydroxy-position isomers thereof including, without reservation, closely related polyhydroxy radicals, e.g., 3,4-dihydroxybutyl.

Alkoxyalkyl of from 2 to 8 carbon atoms, inclusive, includes, for example, methoxymethyl, 2-methoxyethyl, 3-methoxypropyl, n-butoxyethyl, n-propoxyamyl, 6-ethoxyhexyl, α-methoxyisobutyl, and the various homologues and isomers thereof. Lower-alkoxy of from 1 to 4 carbon atoms, inclusive, follows a like variation of alkoxy groups.

Haloalkyl of from 1 to 7 carbon atoms, inclusive, includes, for example, chloromethyl, iodomethyl, bromomethyl, fluoromethyl, 3-chloroheptyl, trifluoromethyl, 2-chloroethyl, 2,2-difluoroethyl, 2,2-diiodoethyl, 3-chloropropyl, 2-bromopropyl, iodoisopropyl, 1,3,3-trichlorobutyl, 1,3,3-tribromoheptyl, and other halogenated straight and branched chain alkyl of from 1 to 7 carbon atoms, inclusive. Halolower-alkyl of from 1 to 4 carbon atoms, inclusive, follows the same variations.

Halocycloalkyl of from 3 to 7 carbon atoms, inclusive, includes for example, cyclopropyl chloride, cyclobutyl bromide, cyclopentyl chloride, cyclohexyl chloride, cyclohexyl - 1,3 - dibromide, 4 - methylcyclohexyl bromide, and cycloheptyl bromide (suberyl bromide).

Substituted phenyl groups R include for example, p-tolyl, 2,5-xylyl, p-anisyl, p-phenethyl, p-chlorophenyl, 3,4-dichlorophenyl, 2,5-dichlorophenyl, p-fluorophenyl, m-chlorophenyl, o-chlorophenyl, p-isopropylphenyl, p-iodophenyl, p-bromophenyl, p-ethoxyphenyl, 5-chloro-o-anisyl, p-butoxyphenyl, p-tert.butylphenyl, 5-ethyl-o-anisyl, and the like.

PREPARATION I

Part A.—Isobutyraldehyde phenylhydrazone

To a solution consisting of 7.2 g. (0.1 mole) isobutyraldehyde in 150 ml. chloroform was added, with stirring, 10.8 g. (0.1 mole) phenylhydrazine. The reaction flask was covered with aluminum foil and nitrogen gas was passed into the sealed flask during the reaction. The reaction mixture was stirred for 1 hr., and then heated in order to remove, by distillation, the water produced by the reaction. About 50 ml. of a water:chloroform azeotrope was collected. Enough carbon tetrachloride was then added to bring the reaction mixture back to its original volume, thus producing a chloroform:carbon tetrachloride solution of isobutyraldehyde phenylhydrazone.

Part B.—Isobutyryl chloride (2,4-dichlorophenyl)hydrazone

The chloroform:carbon tetrachloride solution of isobutyraldehyde phenylhydrazone prepared in Part A, above, was diluted to a volume of 300 ml. with carbon tetrachloride, and the air in the flask was replaced with nitrogen gas before about 14 ml. chlorine (0.3 mole) was introduced into the reaction mixture. The chlorine is introduced as a liquid in an open ended vessel from which it volatilizes to mix with and react with the isobutyraldehyde phenylhydrazone. The mixture was stirred and kept cool (below 5° C.). After ½ hr, a sample of the reaction mixture assayed by thin layer chromatography (on silica gel with technical hexane—a mixture of isomeric hexanes boiling at 142° to 156° Fahrenheit) showed no starting material present. The reaction mixture was filtered, and the solvents were removed from the filtrate by evaporation. The residue thus obtained was dissolved in 250 ml. technical hexane and the solution was poured over a column of silica gel (1365 g.). Elution of the column with technical hexane and evaporation of the solvent from the eluate gave 4.0 g. of isobutyryl chloride (2,4 - dichlorophenyl)hydrazone as a light red oil.

*Analysis.*—Calc'd for $C_{10}H_{11}Cl_3N_2$ (percent): C, 45.22; H, 4.17; Cl, 40.05; N, 10.55. Found (percent): C, 45.59; H, 4.42; Cl, 40.26; N, 10.02.

PREPARATION II

Following the procedure of Preparation I, Part A, but substituting (2,4,6-trichlorophenyl)hydrazine, o-tolylhydrazine, m-tolylhydrazine, p-tolylhydrazine, (2 - bromophenyl)hydrazine, (4 - iodophenyl)hydrazine, (4 - trifluoromethylphenyl)hydrazine, (3 - isopropylphenyl)hydrazine, (2,4,6 - tribromophenyl)hydrazine, (2,5 - dichlorophenyl)hydrazine, (2,4,6-trichloro - 3 - methoxyphenyl)hydrazine and (2,3,4,5,6-pentafluoro)hydrazine for phenylhydrazine, there was prepared:

isobutyraldehyde (2,4,6-trichlorophenyl)hydrazone, isobutyraldehyde o-tolylhydrazone, isobutyraldehyde m-tolylhydrazone,
isobutyraldehyde p-tolylhydrazone,
isobutyraldehyde (2-bromophenyl)hydrazone,
isobutyraldehyde (4-iodophenyl)hydrazone,
isobutyraldehyde (4-trifluoromethylphenyl)hydrazone,
isobutyraldehyde (3-isopropylphenyl)hydrazone,
isobutyraldehyde (2,4,6-tribromophenyl)hydrazone,
isobutyraldehyde (2,5-dichlorophenyl)hydrazone,
isobutyraldehyde (2,4,6-trichloro-3-methoxyphenyl) hydrazone, and
isobutyraldehyde (2,3,4,5,6-pentafluoro)hydrazone, respectively.

PREPARATION III

Following the procedure of Preparation I, Part A, but substituting propionaldehyde, pentanaldehyde, hexanaldehyde, and heptanaldehyde for isobutyraldehyde, there is prepared propionaldehyde phenylhydrazone, pentanaldehyde phenylhydrazone, hexanaldehyde phenylhydrazone, and heptanaldehyde phenylhydrazone, respectively.

PREPARATION IV

Following the procedure of Preparation I, Part B, but substituting isobutyraldehyde (2,4,6-trichlorophenyl)hydrazone for isobutyraldehyde phenylhydrazone, there was prepared isobutyryl chloride (2,4,6-trichlorophenyl)hydrazone.

*Analysis.*—Calc'd for $C_{10}H_{10}Cl_4N_2$ (percent): C, 40.03; H, 3.36; Cl, 47.27; N, 9.34. Found (percent): C, 39.94; H, 3.27; Cl, 47.85; N, 9.25.

PREPARATION V

Pivaloyl chloride (4-chlorophenyl)hydrazone

A quantity (15.9 g.; 0.07 mole) of pivalic acid (4-chlorophenyl)hydrazide and 15.3 g. (0.0735 mole) of phosphorus pentachloride were stirred together in 100 ml. of carbon tetrachloride. The suspension was heated at the reflux temperature for 15 min., when the evolution of hydrogen chloride ceased. The reaction mixture was cooled to about 5° C. and 22.2 g. (0.236 mole) of phenol was added. After the evolution of hydrogen chloride had ceased the carbon tetrachloride was removed by evaporation under reduced pressure and the residual oil was chromatographed on 1 kg. of silica gel. Elution of the column with equal parts of benzene and technical hexane and evaporation of the solvent mixture from the eluate gave pivaloyl chloride (4-chlorophenyl)hydrazone which was recrystallized from petroleum ether. The product thus obtained had a melting point of 42° to 43° C.

*Analysis.*—Calc'd for $C_{11}H_{14}Cl_2N_2$ (percent): C, 53.89; H, 5.76; Cl, 28.93; N, 11.43. Found (percent): C, 53.94; H, 5.70; Cl, 28.82; N, 11.18.

PREPARATION VI

Benzoic acid (2,5-dichlorophenyl)hydrazide

A mixture consisting of 17.7 g. (0.10 mole) 2,5-dichlorophenylhydrazine, 100 ml. benzene, and 22.6 g. (0.10 mole) benzoic anhydride was heated at the reflux temperature for 1½ hrs. After cooling the reaction mixture to about 25° C., it was filtered. The filtrate was evaporated to dryness, and the residue was combined with solids on the filter before dispersing the solids in 700 ml. water basified with 50% aqueous sodium hydroxide to slight alkalinity. The thus washed solids were recovered on a filter, washed with more water, and recrystallized from 225 ml. 95% ethanol. There was thus obtained 23.1 g. (82.2% yield) benzoic acid (2,5-dichlorophenyl)hydrazide having a melting point of 160.5° to 161.5° C. An analytical sample melting at 161° to 162° C. was obtained by recrystallization from 95% ethanol.

*Analysis.*—Calc'd for $C_{13}H_{10}Cl_2N_2O$ (percent): C, 55.53; H, 3.59; Cl, 25.22; N, 9.97. Found (percent): C, 55.57; H, 3.91; Cl, 25.41; N, 10.07.

PREPARATION VII

Benzoyl chloride (2,5-dichlorophenyl)hydrazone

A quantity (16.87 g., 0.06 mole) benzoic acid (2,5-dichlorophenyl)hydrazide (Preparation VI, above) was added to a solution of 12.50 g. (0.06 mole) phosphorus pentachloride in 50 ml. carbon tetrachloride, and the resulting suspension was allowed to react at 25° C. until evolution of hydrogen chloride gas slowed. The reaction mixture was then heated at the reflux temperature for 15 minutes, chilled in ice, and 17.8 g. (0.19 mole) phenol in 75 ml. carbon tetrachloride was added. After the reaction was completed, the carbon tetrachloride was removed by evaporation under reduced pressure at 30° to 32° C. The resulting suspension was filtered, and the filter cake was washed with 50 ml. cold methanol. Two recrystallizations from Skellysolve B gave benzoyl chloride (2,5-dichlorophenyl)hydrazone melting at 84.5° to 86° C.

*Analysis.*—Calc'd for $C_{13}H_9Cl_3N_2$ (percent): C, 52.12; H, 3.03; N, 9.35. Found (percent): C, 52.59; H, 3.16; N, 9.27.

EXAMPLE 1

Preparation of 1',1',2,4,6-pentachlorobenzeneazopropane

A solution consisting of 14.8 g. (0.1 mole) propionaldehyde phenylhydrazone and 200 ml. carbon tetrachloride was cooled to minus 10° C. (−10°) and maintained at this temperature while 30 ml. chloride (6 equivalents) was introduced into the solution. The temperature of the reaction mixture was then allowed to increase to 0° C. for 3 hrs. A sample taken at 2 hrs. indicated that the reaction was completed. After the 3 hrs., the reaction mixture was filtered to remove about 2 g. of solids, and the carbon tetrachloride was removed, from the resulting red solution, by evaporation under reduced pressure. There was thus obtained 20.8 g. of a dark red oil. A 12.0 g. sample of the gum was dissolved in 20 ml. technical hexane. About one-third of this solution was lost but the remainder was poured through a column of silica gel 50 cm. long by 5 cm. in diameter. The chromatogram was developed with 500 ml. technical hexane followed by 150 ml. of a 1:9 mixture (by volume) of benzene and technical hexane. An orange-red band migrated from a brownish band at the top of the column, and when it had reached the bottom, seven 100 ml. fractions were collected, the mixture of benzene and technical hexane being used as eluant. After combining the first five fractions and removing the solvents by evaporation under reduced pressure at 100° C., there was obtained 3.8 g. of 1',1',2,4,6-pentachlorobenzeneazopropane.

*Analysis.*—Calc'd for $C_9H_7Cl_5N_2$ (percent): C, 33.73; H, 2.20; Cl, 55.32; N, 8.74. Found (percent): C, 34.15; H, 2.37; Cl, 56.87; N, 8.87.

Alternative syntheses

Following the same general procedure but using 74.0 g. (0.5 mole) propionaldehyde phenylhydrazone, 500 ml. chloroform as the solvent, and 190 ml. (4.1 mole) chlorine there was obtained 109.6 g. (68%) of 1',1',2,4,6-pentachlorobenzeneazopropane having a boiling point at 145° to 150° C. at 0.4 mm. Hg pressure.

*Analysis.*—Calc'd for $C_9H_7Cl_5N_2$ (percent): C, 33.73; H, 2.20; Cl, 55.32; N, 8.74. Found (percent): C, 33.86; H, 2.25; Cl, 56.42; N, 9.11.

Following the same procedure, but using 55.0 g. (0.22 mole) propionaldehyde (2,4,6 - trichlorophenyl)hydrazone, 300 ml. benzene as the solvent, 35 ml. (0.76 mole) chlorine, and carrying out the reaction at 0° C. there was obtained 53.0 g. (75% yield) of 1',1',2,4,6-pentachlorobenzeneazopropane having a boiling point at 145° C. at a pressure of 0.4 mm. Hg.

*Analysis.*—Calc'd for $C_9H_7Cl_5N_2$ (percent): C, 33.73; H, 2.20; Cl, 55.32; N, 8.74. Found (percent): C, 34.30; H, 2.47; Cl, 55.60; N, 8.98.

EXAMPLE 2

Preparation of 1′,1′,2,4,6-pentachloro-2′-methylbenzeneazopropane

A solution consisting of 12.0 g. (0.074 mole) isobutyraldehyde phenylhydrazone and 200 ml. carbon tetrachloride was chilled to minus 20° C. (−20°) and stirred while 26 ml. (0.56 mole) chlorine was introduced into the solution. This reaction mixture was then set aside at 0° C. for 1 hr. After removing the carbon tetrachloride by evaporation under reduced pressure, the residue thus obtained was dissolved in 150 ml. technical hexane. This solution was poured onto a column of silica gel (280 g.). The chromatogram was developed with a solvent mixture consisting of 1 part benzene and 9 parts technical hexane (by volume), and when the colored zone reached the bottom of the column, 500 ml. of eluate were collected. After removing the solvents from the eluate by evaporation under reduced pressure, there was obtained 13.4 g. of 1′,1′,2,4,6-pentachloro-2′-methylbenzeneazopropane as an orange oil.

Analysis.—Calc'd for $C_{10}H_9Cl_5N_2$ (percent): C, 35.91; H, 2.71; Cl, 53.00; N, 8.38. Found (percent): C, 36.22; H, 2.74; Cl, 54.20; N, 7.93.

EXAMPLE 3

Preparation of 1′,1′,2,4,6-pentachlorobenzeneazobutane

Following the procedure of Example 2, but substituting butyraldehyde phenylhydrazone for isobutyraldehyde phenylhydrazone, there was obtained 1′,1′,2,4,6-pentachlorobenzeneazobutane as an orange oil.

Analysis.—Calc'd for $C_{10}H_9Cl_5N_2$ (percent): C, 35.91; H, 2.71; Cl, 53.00; N, 8.38. Found (percent): C, 35.12; H, 2.64; Cl, 54.30; N, 8.67.

EXAMPLE 4

Preparation of 1′,1′,2,4,6-pentachloro-2′,2′-dimethylbenzeneazopropane

A solution consisting of 28.9 g. (0.1 mole) pivalaldehyde (2,4,6-trichlorophenyl)hydrazone and 200 ml. chloroform was chilled to minus 20° C. (−20°) and 15.0 ml. chlorine was introduced. After an interval of 1 hr. during which the reaction mixture was stirred continuously, the chloroform was removed by evaporation under reduced pressure. An oily residue was obtained that was dissolved in a mixture of benzene and technical hexane (1 part to 3 parts, by volume). This solution was applied to a 280 g. column of silica gel, and the chromatogram was developed with the same solvent mixture. When the colored band had migrated to the bottom of the column, 50 ml. fractions were collected. Fractions 3 through 8 were combined, and the solvents removed by evaporation under reduced pressure. There was thus obtained 28.0 g. of 2′,2′-dimethyl-1′,1′,2,4,6-pentachlorobenzeneazopropane as an orange oil.

Analysis.—Calc'd for $C_{11}H_{11}Cl_5N_2$ (percent): C, 37.91; H, 3.19; Cl, 50.87; N, 8.04. Found (percent): C, 38.16; H, 3.28; Cl, 51.63; N, 7.65.

Following the same procedure, but substituting pivaloyl chloride (4-chlorophenyl)hydrazone for pivalaldehyde (2,4,6-trichlorophenyl)hydrazone, there was prepared the same 1′,1′,2,4,6-pentachloro-2′,2′-dimethylbenzeneazopropane.

EXAMPLE 5

Preparation of 1′,1′,2,4,6-pentachlorobenzeneazohexane

Following the procedure of Example 2, but substituting hexanaldehyde phenylhydrazone for isobutyraldehyde phenylhydrazone and substituting chloroform for carbon tetrachloride as the reaction medium, there was prepared 1′,1′,2,4,6-pentachlorobenzeneazohexane as an orange oil.

Analysis.—Calc'd for $C_{12}H_{13}Cl_5N_2$ (percent): C, 39.76; H, 3.61; Cl, 48.90; N, 7.73. Found (percent): C, 40.13; H, 3.67; Cl, 49.37; N, 7.46.

EXAMPLE 6

Preparation of 1′,1′,2,3,4,6-hexachloro-2′-methylbenzeneazopropane

Following the procedure of Example 2, but substituting isobutyraldehyde (2,5-dichlorophenyl)hydrazone, for isobutyraldehyde phenylhydrazone, there was prepared 1′,1′,-2,3,4,6-hexachloro - 2′ - methylbenzeneazopropane as an orange oil.

Analysis.—Calc'd for $C_{10}H_8Cl_6N_2$ (percent): C, 32.55; H, 2.18; Cl, 57.67; N, 7.60. Found (percent): C, 33.38; H, 2.55; Cl, 58.80; N, 6.92.

EXAMPLE 7

Preparation of 1′,1′,2,4,6-pentachloro-2′,3-dimethylbenzeneazopropane

Following the procedure of Example 2, but substituting isobutyraldehyde m-tolylhydrazone for isobutyraldehyde phenylhydrazone and using chloroform as the organic reaction medium instead of carbon tetrachloride, there was obtained 1′,1′,2,4,6 - pentachloro-2′,3-dimethylbenzeneazopropane as an orange oil.

Analysis.—Calc'd for $C_{11}H_{11}Cl_5N_2$ (percent): C, 37.91; H, 3.18; Cl, 50.87; N, 8.04. Found (percent): C, 38.38; H, 3.73; Cl, 52.39; N, 7.29.

EXAMPLE 8

Preparation of 1′,1′-dichloro-2,3,4,5,6-pentafluoro-2′-methylbenzeneazopropane

Following the procedure of Example 2, but substituting isobutyraldehyde (2,3,4,5,6-pentafluorophenyl)hydrazone for isobutyraldehyde phenylhydrazone, there was obtained 1′,1′-dichloro - 2,3,4,5,6 - pentafluoro - 2′ - methylbenzeneazopropane as an orange oil.

Analysis.—Calc'd for $C_{10}H_7Cl_2F_5N_2$ (percent): C, 37.40; H, 2.20; Cl, 22.08; F, 29.59; N, 8.73. Found (percent): C, 38.75; H, 2.81; Cl, 24.24; F, 27.66; N, 7.99.

EXAMPLE 9

Preparation of 1′,2,4,6-tetrachloro-1′-fluoro-2′-methylbenzeneazopropane

A solution consisting of 9.0 g. (0.055 mole) isobutyryl chloride (2,4,6-trichlorophenyl)hydrazone and 80 ml. trichlorofluoromethane was chilled to minus 60° C. (−60°) and stirred while 8.0 g. (0.077 mole) gaseous trifluoromethyl hypofluorite was added by bubbling a stream of the gas slowly into the solution. This reaction mixture was kept at minus 60° C. for 3 hrs., and was then allowed to warm slowly to 40° C. The trichlorofluoromethane having evaporated during the warming, the residual oil thus obtained (8.1 g.) was poured onto a 280 g. column of silica gel. The chromatogram was developed with a solvent mixture consisting of equal parts benzene and technical hexane (by volume). When the colored zone had reached the bottom of the column, the eluate was collected and the solvents were removed by evaporation under reduced pressure to give 1′,2,4,6-tetrachloro-1′-fluoro-2′-methylbenzeneazopropane as an orange oil.

Analysis.—Calc'd for $C_{10}H_9Cl_4FN_2$ (percent): C, 37.76; H, 2.85; Cl, 44.60; F, 5.98; N, 8.81. Found (percent): C, 37.88; H, 3.15; Cl, 44.92; F, 5,91; N, 8.74.

Following the same procedure but substituting isobutyryl chloride (2,4-dichlorophenyl)hydrazone for isobutyryl chloride (2,4,6-trichlorophenyl)hydrazone, there was prepared 1′,2,4-trichloro-1′-fluoro - 2′-methylbenzeneazopropane.

EXAMPLE 10

Preparation of 1′,1′,2,4,6-pentachlorobenzeneazoethane

A suspension consisting of 9.0 g. (0.05 mole) pyruvic acid 2-(phenylhydrazone) in 100 ml. chloroform was chilled to minus 20° C. (−20°) and stirred while 30 ml. (0.65 mole) chlorine was introduced into the suspension. This reaction mixture was permitted to warm up to 25°

C. with condensation of the chlorine vapors in a solid carbon dioxide condenser. It was held at that temperature for 1 hr. The chloroform was removed by evaporation under reduced pressure, and the residual orange oil thus obtained was dissolved in technical hexane. The solution was poured onto a 280 g. column of silica gel, and the chromatogram was developed with a solvent mixture consisting of 1 part benzene and 9 parts technical hexane (by volume). After collecting the eluate as heretofore and removing the solvents by evaporation under reduced pressure, there was obtained 12.1 g. of 1',1',2,4,6-pentachlorobenzeneazoethane as an orange oil.

*Analysis.*—Calc'd for $C_8H_5Cl_5N_2$ (percent): C, 31.63; H, 1.64; Cl, 57.86; N, 9.14. Found (percent): C, 31.57; H, 1.79; Cl, 59.49; N, 8.75.

EXAMPLE 11

Preparation of 1',1',2,3,4,5,6-heptachlorobenzeneazoethane

A solution consisting of 20.0 g. (0.08 mole) pyruvic acid 2-[(3,5-dichlorophenyl)hydrazone] and 250 ml. chloroform was chilled to minus 40° C. and stirred while 50 ml. chlorine was introduced. After addition of the chlorine was completed, the reaction mixture was permitted to warm up to 25° C. Chlorine vapors were trapped in a condenser cooled with a mixture of solid carbon dioxide and acetone and thus returned to the reaction mixture. The reaction mixture was set aside for 6 hrs. during which time the solid carbon dioxide sublimed completely and the excess $Cl_2$ escaped. The chloroform was then removed by evaporation under reduced pressure, and the residue thus obtained was dissolved in hot methanol. The methanolic solution was chilled and a precipitate formed. The precipitate was collected on a filter and washed with methanol. The solids on the filter were recrystallized from technical hexane. There was thus obtained 15.4 g. of 1',1',2,3,4,5,6-heptachlorobenzeneazoethane having a melting point at 99° to 101° C.

*Analysis.*—Calc'd for $C_8H_3Cl_7N_2$ (percent): C, 25.59; H, 0.80; N, 7.46. Found (percent): C, 25.69; H, 1.00; N, 7.37.

EXAMPLE 12

Following the procedure of Example 4, but substituting heptanaldehyde (2,4,6-trichlorophenyl)hydrazone, octanaldehyde (2,4,6-trichlorophenyl)hydrazone, and 2-ethylhexanaldehyde (2,4,6 - trichlorophenyl)hydrazone for pivalaldehyde (2,4,6-trichlorophenyl)hydrazone there was prepared:

1',1',2,4,6-pentachlorobenzeneazoheptane,
1',1',2,4,6-pentachlorobenzeneazooctane, and
1',1',2,4,6-pentachloro-2'-ethylbenezeneazohexane, respectively.

EXAMPLE 13

Following the procedure of Example 9, but substituting cyclopropane carbonyl chloride (2,4,6-trichlorophenyl) hydrazone, cyclobutane carbonyl chloride (2,4,6-trichlorophenyl)hydrazone, cyclopentane carbonyl chloride (2,4,6-trichlorophenyl)hydrazone, cyclohexane carbonyl chloride (2,4,6-trichlorophenyl)hydrazone, cycloheptane carbonyl chloride (2,4,6-trichlorophenyl)hydrazone, and 3-methylcyclohexane carbonyl chloride (2,4,6-trichlorophenyl)hydrazone for isobutyryl chloride (2,4,6-trichlorophenyl)hydrazone, there is prepared:

1',2,4,6-tetrachloro-1'-cyclopropyl-1'-fluorobenzeneazomethane,
1',2,4,6-tetrachloro-1'-cyclobutyl-1'-fluorobenzeneazomethane,
1',2,4,6-tetrachloro-1'-cyclopentyl-1'-fluorobenzeneazomethane,
1',2,4,6-tetrachloro-1'-cyclohexyl-1'-fluorobenzeneazomethane,
1',2,4,6-tetrachloro-1'-cycloheptyl-1'-fluorobenzeneazomethane, and
1',2,4,6-tetrachloro-1'-(3-methylcyclohexyl)-1'-fluorobenzeneazomethane, respectively.

EXAMPLE 14

Following the procedure of Example 2, but substituting trifluoroacetaldehyde phenylhydrazone, trichloroacetaldehyde phenylhydrazone, chloroacetaldehyde phenylhydrazone, glycolaldehyde phenylhydrazone, 3,4-diiodobutyraldehyde phenylhydrazone, 3 - methoxypropionaldehyde phenylhydrazone, 7-methoxyheptanaldehyde phenylhydrazone, 3,3-dibromooctanaldehyde phenylhydrazone, and 7-hydroxyoctanaldehyde phenylhydrazone for isobutyraldehyde phenylhydrazone, there was prepared:

1',1',2,4,6-pentachloro-2',2',2'-trifluorobenzeneazoethane,
1',1',2',2',2',2,4,6-octachlorobenzeneazoethane,
1',1',2',2,4,6-hexachlorobenzeneazoethane,
1',1',2,4,6-pentachloro-2'-hydroxybenzeneazoethane,
1',1',2,4,6-pentachloro-3',4'-diiodobenzeneazobutane,
1',1',2,4,6-pentachloro-3'-methoxybenzeneazopropane,
1',1',2,4,6-pentachloro-7'-methoxybenzeneazoheptane,
3',3'-dibromo-1',1',2,4,6-pentachlorobenzeneazooctane, and
1',1',2,4,6-pentachloro-7'-hydroxybenzeneazooctane, respectively.

EXAMPLE 15

Following the procedure of Example 11, but substituting pyruvic acid 2-[(2,5-xylyl)hydrazone], pyruvic acid 2-[(3,5-diethylphenyl)hydrazone], pyruvic acid 2-[(2,3-diiodophenyl)hydrazone], pyruvic acid 2-[(α,α,α-trifluoro-m-tolyl)hydrazone], pyruvic acid 2-[(α,α,α-trifluoro-p-tolyl)hydrazone], pyruvic acid 2-[(4-methoxy-m-tolyl)hydrazone], pyruvic acid 2-[(p-butoxyphenyl)hydrazone], pyruvic acid 2-[(3-5-diisobutylphenyl)hydrazone], pyruvic acid 2-[(m-isopropylphenyl)hydrazone], pyruvic acid 2-{[2-(2 - fluoroethyl)phenyl]hydrazone}- pyruvic acid 2-{[3-(2,2-difluoropropyl)phenyl]hydrazone}, pyruvic acid 2-[(4-fluorophenyl)hydrazone], pyruvic acid 2-[(4-bromophenyl)hydrazone] for pyruvic acid 2-[(3,5-dichlorophenyl)hydrazone], there was prepared:

1',1',2,4-tetrachloro-3,6-dimethylbenzeneazoethane,
1',1',2,4,6-pentachloro-3,5-diethylbenzeneazoethane,
1',1',2,4-tetrachloro-5,6-diiodobenzeneazoethane,
1',1',2,4,6-pentachloro-(α,α,α-trifluoro-m-tolyl)azoethane,
1',1',2,6-tetrachloro-(α,α,α-trifluoro-p-tolyl)azoethane,
1',1',2,6-tetrachloro-(4-methoxy-m-tolyl)azoethane,
4-butoxy-1',1',2,6-tetrachlorobenzeneazoethane,
1',1',2,4,6-pentachloro-3,5-diisobutylbenzeneazoethane,
1',1',2,4,6-pentachloro-3-isopropylbenzeneazoethane,
1',1',2,4-tetrachloro-6-(2-fluoroethyl)benzeneazoethane,
1',1',2,4,6-pentachloro-3-(2,2-difluoropropyl)benzeneazoethane,
1',1',2,6-tetrachloro-4-fluorobenzeneazoethane, and
4-bromo-1',1',2,6-tetrachlorobenzeneazoethane, respectively.

EXAMPLE 16

Following the procedure of Example 1, but substituting bromine for chlorine and separately substituting pivaloyl chloride (o-tolyl)hydrazone and pivaloyl chloride phenylhydrazone for propionaldehyde phenylhydrazone, there was prepared:

1',4,6-tribromo-1'-chloro-2,2',2'-trimethylbenzeneazopropane,
1',2,4,6-tetrabromo-1'-chloro-2',2'-dimethylbenzeneazopropane, respectively.

EXAMPLE 17

Following the procedure of Example 9, but substituting isobutyraldehyde (2,4,6 - trichlorophenyl)hydrazone for isobutyryl chloride (2,4,6 - trichlorophenyl)hydrazone, there is prepared 2,4,6 - trichloro-1',1'-difluoro-2'-methylbenzeneazopropane.

EXAMPLE 18

Following the procedure of Example 9, but substituting acetyl chloride (3 - butyl - 2,4,6 - trichlorophenyl)hydrazone, propionyl chloride (2,3,4,6 - tetrachlorophenyl)hydrazone, pivaloyl bromide (2,4,6 - trichlorophenyl)hydrazone, pivaloyl chloride [2 - chloro - 4,6 - bis(trifluoromethyl)phenyl]hydrazone, butyryl chloride (2,4,6 - tribromophenyl)hydrazone, and valeryl chloride (2,4,6 - trichlorophenyl)hydrazone, there were prepared:

3-butyl-1',2,4,6-tetrachloro-1'-fluorobenzeneazoethane,
1',2,3,4,6-pentachloro-1'-fluorobenzeneazopropane,
1'-bromo-2,4,6-trichloro-1'-fluoro-2',2'-dimethylbenzeneazopropane,
1',2-dichloro-1'-fluoro-2',2'-dimethyl-4,6-bis(trifluoromethyl)benzeneazopropane,
2,4,6-tribromo-1'-chloro-1'-fluorobenzeneazobutane, and
1',2,4,6-tetrachloro-1'-fluorobenzeneazopentane,
respectively.

EXAMPLE 19

Following the procedure of Example 2, but substituting isobutyraldehyde o-tolylhydrazone, isobutyraldehyde p-tolylhydrazone, isobutyraldehyde (2-bromophenyl)hydrazone, isobutyraldehyde (4-iodophenyl)hydrazone, isobutyraldehyde (3-isopropylphenyl)hydrazone, isobutyraldehyde (4-trifluoromethylphenyl)hydrazone, isobutyraldehyde (3-isopropylphenyl)hydrazone, isobutyraldehyde (2,4,6 - tribromophenyl)hydrazone, and isobutyraldehyde (2,4,6 - trichloro - 3 - methoxyphenyl)hydrazone for isobutyraldehyde phenylhydrazone, there were prepared:

1',1',2,4-tetrachloro-2',6-dimethylbenzeneazopropane,
1',1',2,6-tetrachloro-2',4-dimethylbenzeneazopropane,
2-bromo-1',1',4,6-tetrachloro-2'-methylbenzeneazopropane,
1',1',2,6-tetrachloro-4-iodo-2'-methylbenzeneazopropane,
1',1',2,6-tetrachloro-2'-methyl-4-(trifluoromethyl)benzeneazopropane,
1',1',2,4,6-pentachloro-3-isopropyl-2'-methylbenzeneazopropane,
2,4,6-tribromo-1',1'-dichloro-2'-methylbenzeneazopropane, and
1',1',2,4,6-pentachloro-3-methoxy-2'-methylbenzeneazopropane, respectively.

EXAMPLE 20

Preparation of 1',1',2,4,6-pentachloro-1'-phenylbenzeneazomethane

Chlorine [10.6 ml. (0.23 mole)] was added to a solution of 16.7 g. (0.05 mole) benzoyl chloride (2,4,6-trichlorophenyl)hydrazone in 200 ml. carbon tetrachloride. The reaction mixture was allowed to stand at 25° C. for 18 hrs. The solvent was then removed by evaporation under reduced pressure to give a dark red oil. A portion of this oil (6.5 g.) was dissolved in a solvent mixture consisting of equal parts benzene and technical hexane. This solution was poured through a column of 80 g. silica gel. The chromatogram was developed using the same solvent mixture and the fractions containing the orange product were pooled. After removing the solvents by evaporation under reduced pressure, there was obtained 5.0 g. of 1',1',2,4,6 - pentachloro - 1'-phenylbenzeneazomethane as an orange-red oil.

*Analysis.*—Calc'd for $C_{13}H_7Cl_5N_2$ (percent): C, 42.37; H, 1.92; Cl, 48.11; N, 7.60. Found (percent): C, 42.44; H, 2.25; Cl, 49.20; N, 7.04.

Following the same procedure, but substituting benzoyl chloride o-tolylhydrazone, benzoyl chloride-(2,4-dibromophenyl)hydrazone, -(2,5 - dichlorophenyl)hydrazone, -(2,4,6 - trichloro - 3 - isopropylphenyl)hydrazone, -(2,6-dibromo - 4 - butylphenyl)hydrazone, -(2-bromo-5-iodophenyl)hydrazone, -(2,4,6-trichloro - m - anisyl)hydrazone, -(2 - trifluoromethylphenyl)hydrazone, and benzoyl chloride (4 - trifluoromethyl)phenylhydrazone for benzoyl chloride (2,4,6 - trichlorophenyl)hydrazone there is prepared:

1',1',2,4-tetrachloro-6-methyl-1'-phenylbenzeneazomethane,
2,4-dibromo-1',1',6-trichloro-1'-phenylbenzeneazomethane,
1',1',2,3,4,6-hexachloro-1'-phenylbenzeneazomethane,
1',1',2,4,6-pentachloro-1'-phenyl-3-isopropylbenzeneazomethane,
2,6-dibromo-4-butyl-1',1'-dichloro-1'-phenylbenzeneazomethane,
2-bromo-1',1',4,6-tetrachloro-5-iodo-1'-phenylbenzeneazomethane,
1',1',2,4,6-pentachloro-3-methoxy-1'-phenylbenzeneazomethane,
1',1',2,4-tetrachloro-6-trifluoromethyl-1'-phenylbenzeneazomethane, and
1',1',2,6-tetrachloro-4-trifluoromethyl-1'-phenylbenzeneazomethane, respectively.

Following the same procedure but substituting p-bromobenzoyl chloride phenylhydrazone, m-chlorobenzoyl chloride phenylhydrazone, 3,4-dichlorobenzoyl chloride phenylhydrazone, o-chlorobenzoyl chloride (2-trifluoromethylphenyl)hydrazone, and p-chlorobenzoyl chloride (2,4,6 - tribromo - m - tolyl)hydrazone for benzoyl chloride (2,4,6-trichlorophenyl)-hydrazone there is prepared:

1',1',2,4,6-pentachloro-1'-(p-bromophenyl)benzeneazomethane,
1',1',2,4,6-pentachloro-1'-(m-chlorophenyl)benzeneazomethane,
1',1',2,4,6-pentachloro-1'-(3,4-dichlorophenyl)benzeneazomethane,
1',1',2,4-tetrachloro-6-trifluoromethyl-1'-(o-chlorophenyl)benzeneazomethane, and
2,4,6-tribromo-1',1'-dichloro-3-methyl-1'-(p-chlorophenyl)benzeneazomethane, respectively.

The new 1' - variable-1',1'-dihalo-halobenzenezomethanes of this invention (compounds according ot Formula I) are active against arthropod pests, particularly insects and mites. They can be used as the pure compounds, such as those described in the examples, or as technical grade compounds from commercial production; but for practical reasons, the compounds are preferably utilized as anti-arthropodal formulations. More particularly, the 1'-variable-1',1'-dihalo-halobenzenazomehtanes of this invention are preferably formulated with a diluent carrier. There are many different kinds of diluent carriers useful for preparing anti-arthropodal formulations. For example, dispersible carriers are commonly used in the insecticide and miticide arts. Such carriers may or may not include adjuvants such as wetting agents, emulsifying agents, stickers and other components that indirectly promote efficacy.

For example, anti-arthropodal formulations useful against insects and mites which infest plants can be formulated as dusts, wettable powders, emulsifiable concentrates, aqueous dispersions, solutions. Flowable creams can be prepared for application to animals, and foliage, seeds, or other parts of plants. Liquid formulations suitable for root or bole infusion can be made; and granular formulations can be prepared for application to soil or in crevices and corners. Moreover, the 1'-variable-1',1'-dihalo-halobenzeneazomethanes of the invention can be the sole, characterizing active agent in a formulation, or other anti-arthropodal, fungicidal, virucidal, bactericidal, or synergistic components may be included.

The 1' - variable-1',1'-dihalo-halobenzeneazomethanes although obtained most generally as oils can be formulated as dusts by grinding a mixture of the compound and a major proportion of a pulverulent carrier in the presence of each other. Grinding is conveniently accomplished in a ball mill, a hammermill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling insects and mites over wide areas when applied by airplane. They are also indicated for application to the undersides of plant foliage and to the skin of poultry and hairy animals (e.g., for ticks).

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium silicate, synthetic magnesium silicate, and colloidal silica; and organic flours such as wood, walnut shell, soybean, cottonseed, and tobacco flours, and free-flowing, hydrophobic starches.

Dusts are also conveniently prepared by dissolving 1′-variable-1′,1′-dihalo-halobenzeneazomethanes in a volatile solvent such as methylene chloride, mixing the solution with a pulverulent carrier and evaporating the solvent.

The proportions of pulverulent carrier and 1′-variable-1′,1′-dihalo-halobenzeneazomethanes can vary over a wide range depending upon the arthropod pests to be controlled and the conditions of treatment. In general, dust formulations can contain up to about 90% (on a weight basis) of the active ingredient if the individual compound is a solid. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emco H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia Clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia Clay | 72 |

This formulation, when dispersed in water at the rate of 10 lbs. per 100 gals., gives a spray formulation containing about 0.3% (3000 p.p.m.) active ingredient which can be applied to arthropods, plants or other insect or mite habitats, or insect or mite foods to control arthropods including insects, mites, ticks, and spiders.

If desired, dispersants such as methyl cellulose, polyvinyl alcohol, sodium ligninsulfonates, and the like, can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The anti-arthropodal 1′-variable-1′,1′-dihalo-halobenzeneazomethanes of this invention can be applied to arthropod pests, objects, or situs in aqueous sprays without a solid carrier. Since, however, the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess 1′-variable-1′,1′-dihalo-halobenzeneazomethanes will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which 1′-variable-1′,1′-dihalo-halobenzeneazomethanes are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects, mites, spiders, and ticks.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The granular compositions of this invention are convenient for application to soil, crevices, and corner areas when persistence is desired. Granulars are readily applied broadcast or by localized, e.g., in-the-row applications. The individual granules may be any desired size range from 30 to 60 mesh advantageously up to 20 to 40 mesh, or even larger. Granulars are prepared by dissolving the active compound in a solvent such as methylene chloride, xylene, or acetone and applying the solution to a quantity of a granulated absorbent carrier. Representative granulated absorbent carriers include ground corn cobs, ground walnut shells, ground peanut hulls, and the like. If desired, the impregnated granulated absorbent carrier can be coated with a coating that will preserve the integrity of the granular until it is applied to an object or situs favorable for release of the active ingredient.

The rates of application to arthropod pests, objects, or situs will depend upon the species of arthropods to be controlled, the presence or absence of desirable living organisms, temperature conditions of treatment, and the method and efficiency of application. In general, anti-arthropodal activity is obtained when the compounds are applied at concentrations of about 10 to about 6000 p.p.m., preferably at concentrations of about 30 to about 4000 p.p.m.

The compositions containing 1'-variable-1',1'-dihalo-halobenzeneazomethanes according to the invention, can be applied to arthropod pests, objects or situs by conventional methods. For example, an area of soil, a building, or plants can be treated by spraying wettable powder suspensions, emulsions, or solutions from power sprayers or from hand-operated knapsack sprayers. Dips can be used for livestock. Dusts can be applied by power dusters, or by hand-operated dusters. Creams and ointment formulations can be applied to skin or objects for prolonged protection from arthropod pests.

The active compounds of the invention can also be formulated in relatively dilute proportions in a dispersible insecticide carrier for household applications. Thus, the acitve compounds can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects or mites, the particular pest to be controlled, the particular situs being treated, the age or degree of development of animals or plants, the prevailing weather conditions, such as temperature, relative humidity, rainfall, dews, and so forth.

The compounds of Formula I are effective pesticides that can be used to control invertebrate pests in agriculture, in industry, and around the home. The compounds have been found to be active against invertebrate animals of the Phylum Arthropoda, illustratively Class Insecta, for example, order Coleoptera, more specifically, the cotton boll weevil (*Anthonomus grandis* Boheman), the confused flour beetle (*Tribolium confusum* Jacquelin de Val), and the Mexican bean beetle (*Epilachna varivestis* Mulsant) order Diptera, more specifically, the housefly (*Musca domestica* Linnaeus), order Orthoptera, more specifically, the house cricket (*Acheta domesticus* Linnaeus), and the German cockroach (*Blatella germanica* Linnaeus), and order Lepidoptera, more specifically, the Southern armyworm (*Prodenia eridania* Cramer), and Class Arachnida, for example, order Acarina, more specifically, the two-spotted spider mite (*Tetranychus urticae* Koch).

Efficacy against arthropod pests has been demonstrated at concentrations of 1000, 500, 100, 50, and even 10 p.p.m. depending upon the specific arthropod used. Some invertebrate animal pests will be more sensitive to the compounds than others, and others might be quite resistant. In general, the compounds of Formula I are used at concentrations ranging from about 30 to about 6000 p.p.m.

We claim:

1. A method of controlling insect, mite, spider and tick pests whereby said pests are contacted with a biocidally effective amount of a 1'-variable-1',1'-diahalo-halobenzeneazomethane of the formula:

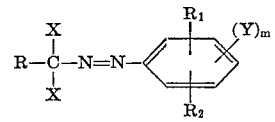

wherein R is hydrogen, alkyl, or from 1 to 7 carbon atoms, inclusive; cycloalkyl of from 3 to 7 carbon atoms, inclusive; haloalkyl of from 1 to 7 carbon atoms, inclusive; halocycloalkyl of from 3 to 7 carbon atoms, inclusive; alkoxyalkyl of from 2 to 8 carbon atoms, inclusive; hydroxyalkyl of from 1 to 7 carbon atoms, inclusive; or phenyl, optionally having 1, 2, or 3 substituents selected from the group consisting of halogen atoms, lower-alkyl of from 1 to 4 carbon atoms, inclusive, halo-lower-alkyl of from 1 to 4 carbon atoms, inclusive, and lower-alkoxy of from 1 to 4 carbon atoms, inclusive; the X's are independently bromine, chlorine, or fluorine; $m$ is an integer 0, 1, 2, or 3; and $R_1$, $R_2$, and Y are independently halogen, lower-alkyl of from 1 to 4 carbon atoms, inclusive; halolower-alkyl of from 1 to 4 carbon atoms, inclusive; or lower-alkoxy of from 1 to 4 carbon atoms, inclusive; providing however, that at least one of $R_1$ and $R_2$ is halogen, and that the sum of the carbon atoms in substituents $R_1$, $R_2$, and Y may not be more than 15.

2. The method according to claim 1 wherein the compound is a 1'-alkyl-1',1'-dihalo-halobenzeneazomethane.

3. The method according to claim 2 wherein the compound is a 1',1'-dichloro-halobenzeneazoalkane.

4. The method according to claim 3 wherein the compound is a 1',1'-dichloro-chlorobenzeneazopropane.

5. The method according to claim 4 wherein the compound is 1',1',2,4,6-pentachlorobenzeneazopropane.

6. The method according to claim 4 wherein the compound is 1',1˗,2,4,6 - pentachloro - 2',3 - dimethylbenzene-azopropane.

7. The method according to claim 4 wherein the compound is 1',1',2,4,6-pentachloro-2'-methylbenzeneazopropane.

8. The method according to claim 4 wherein the compound is 1',1',2,4,6 - pentachloro-2',2'-dimethylbenzeneazopropane.

9. The method according to claim 4 wherein the compound is 1',1',2,3,4,5 - hexachloro-2'-methylbenzeneazopropane.

10. The method according to claim 3 wherein the compound is a 1',1'-dichloro-chlorobenzeneazoethane.

11. The method according to claim 10 wherein the compound is 1',1',2,4,6-pentachlorobenzeneazoethane.

12. The method according to claim 10 wherein the compound is 1',1',2,3,4,5,6-heptachlorobenzeneazoethane.

13. The method according to claim 3 wherein the compound is 1',1',2,4,6-pentachlorobenzeneazobutane.

14. The method according to claim 3 wherein the compound is 1',1',2,4,6-pentachlorobenzeneazohexane.

15. The method according to claim 3 wherein the compound is 1',1',-dichloro-fluorobenzeneazoalkanes.

16. The method according to claim 15 wherein the compound is 1',1'-dichloro - 2,3,4,5,6 - pentafluoro - 2'-methylbenzeneazopropane.

17. The method according to claim 2 wherein the compond is a 1'-chloro-1'-halo-halobenzeneazoalkane.

18. The method according to claim 17 wherein the compound is a 1' - chloro - 1' - fluoro - chlorobenzeneazoalkane.

19. The method according to claim 18 wherein the compound is 1',2,4,6 - tetrachloro - 1'-fluoro - 2' - methylbenzeneazopropane.

20. A formulation effective against insect, mite, spider and tick pests comprising a diluent carrier and a biocidally effective amount of a 1'-variable-1',1'-dihalohalobenzeneazomethane of the formula:

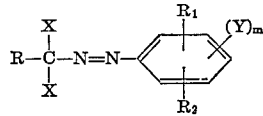

wherein R is hydrogen, alkyl of from 1 to 7 carbon atoms, inclusive; cycloalkyl of from 3 to 7 carbon atoms, inclusive; haloalkyl of from 1 to 7 carbon atoms, inclusive; halocycloalkyl of from 3 to 7 carbon atoms, inclusive; alkoxyalkyl of from 2 to 8 carbon atoms, inclusive; hydroxyalkyl of from 1 to 7 carbon atoms, inclusive; or phenyl, optionally having 1, 2, or 3 substituents selected fro the group consisting of halogen atoms, loweralkyl of from 1 to 4 carbon atoms, inclusive, haloloweralkyl of from 1 to 4 carbon atoms, inclusive, and loweralkoxy of from 1 to 4 carbon atoms, inclusive; the X's are independently bromine, chlorine, or fluorine; $m$ is an integer 0, 1, 2, or 3; and $R_1$, $R_2$, and Y are independently halogen, lower-alkyl of from 1 to 4 carbon atoms, inclusive; halolower-alkyl of from 1 to 4 carbon atoms, inclusive; or lower-alkoxy of from 1 to 4 carbon atoms, inclusive; providing however, that at least one of $R_1$ and $R_2$ is halogen, and that the sum of the carbon atoms in substituents $R_1$, $R_2$, and Y may not be more than 15.

21. A formulation according to claim 20 wherein the compound is a 1'-alkyl - 1',1' - dihalo - halobenzeneazomethane.

22. A formulation according to claim 21 wherein the compound is a 1',1'-dichloro-halobenzeneazoalkane.

23. A formulation according to claim 22 wherein the compound is a 1',1'-dichloro-chlorobenzeneazoalkane.

24. A formulation according to claim 20 wherein the carrier is an inert organic solvent.

25. A formulation according to claim 24 wherein a surfactant is also present.

26. A formulation according to claim 20 wherein the carrier is a finely divided pulverulent carrier.

27. A formulation according to claim 26 wherein a surfactant is also present.

References Cited
UNITED STATES PATENTS 2,786,044  3/1957  Warner et al. ____ 260—566 B X
2,818,367  12/1957  Jaworski et al. _____ 424—327

ALBERT T. MEYERS, Primary Examiner
A. J. ROBINSON, Assistant Examiner

U.S. Cl. X.R.
260—192